Patented May 16, 1939

2,158,499

UNITED STATES PATENT OFFICE 2,158,499

METHOD FOR DECOMPOSING SCLEROPROTEINS AND NEW PRODUCTS OBTAINED THEREBY

Wolfgang Grassmann, Dresden, and Hans Reich, Berlin, Germany

No Drawing. Application February 14, 1936, Serial No. 63,940. In Germany January 2, 1933

14 Claims. (Cl. 260—112)

This invention refers to valuable decomposition products of proteins and more particularly to decomposition products of highly resistant scleroproteins, especially of keratins, and a method of producing the same.

There are already known various methods for the decomposition of keratinic compounds such as contained in hair, feathers, horn, hoofs, wool, and the like, whereby products of lower molecular weight are formed. Said decomposition has been carried out by means of concentrated acids, with dilute acids while heating, with alkalies, as well as with oxidizing agents as, for instance, bromine-glacial acetic acid or hydrogen peroxide-sulphuric acid.

The products obtained by these methods, especially those produced by means of alkali or oxidation which are in general water-soluble may be attacked by proteolytic enzymes.

All these processes, however, possess the disadvantage, that the albuminoid molecule is thoroughly attacked so that valuable constituents are destroyed. Thus, on treating the proteins with acids, the valuable tryptophane is destroyed to a large extent while on treating them with alkalis; cystine is decomposed; likewise decomposition with oxidizing agents destroys cystine almost completely and the aromatic amino acids, such as tryptophane, for the most part. The decomposition generally goes so far that the products obtained are water-soluble and their sulfur content is considerably lower than that of the starting material.

According to the present invention the decomposition of the scleroproteins is carried out in such a manner that the valuable protein constituents present in the starting material, such as cystine, trytophane and tyrosine, are to a large extent preserved. Thereby decomposition takes place in two steps. In the first step the scleroproteins are loosened up by agents, capable of splitting up peptide bonds, in such a manner that they are still water-insoluble but have become digestible, whereas in the second step they are converted by enzymatic decomposition into water-soluble compounds. Both the water-insoluble products of the first step and the water-soluble products of the second step represent valuable new compounds.

Besides keratinous substances as contained in hair, feathers, hoofs, wool and the like, other scleroproteins, such as silk, elastin, fish scales and the like, may also be used as starting materials for carrying out the process claimed and described herein.

These materials are subjected in the first step to a mild but complete dissolution insufficient hydrolytic or acidolytic treatment with acids or acid chlorides. The treatment is interrupted when the starting materials are still water-insoluble but sufficiently transformed to be digestible by proteolytic enzymes. By said treatment, small amounts of water-soluble substances are also formed that can be separated from the water-insoluble products by washing. Thereby duration of treatment, temperature limits and concentration are selected according to the strength of the acids or acid chlorides used. The optimum working conditions can be ascertained for any given starting material by preliminary experiments, whereby digestibility tests are also taken into consideration for control purposes. Of acids that may be used for carrying out the process, there may be mentioned, among the group of inorganic acids, for instance, hydrochloric acid, sulfuric acid, phosphoric acid and hydrofluoric acid; among the group of organic acids, formic acid, glacial acetic acid and also glacial acetic acid containing hydrogen halide. Among the acid chlorides thionyl chloride might, for example, be mentioned. The new products can also be obtained by treating scleroprotein with gaseous hydrogen chloride in the presence of moisture at room temperature. The speed of acidolytic action of hydrochloric acid is decisively influenced by the presence of small amounts of water. The smaller the amount of water present and the shorter the time the starting material is exposed to the action of the hydrogen chloride, the higher the yield of insoluble decomposition products. The yield of insoluble products varies between 40 and 95% according to experimental conditions. As the water-soluble fractions formed as by-products are relatively poor in cystine, the cystine content of the insoluble products is more or less enriched, even up to 180% according to conditions, as compared with that of the starting material. In place of hydrogen chloride other hydrogen halides can also be used in the presence of moisture.

The method to be preferred for the conversion of keratins into water-insoluble products is that wherein the starting materials are subjected to hydrolytic or acidolytic decomposition by means of acids or acid chlorides under such conditions, that the decomposition products while they have not yet lost their natural form are, however, substantially water-insoluble and digestible by proteolytic enzymes so as to form water-soluble products.

By properly choosing working conditions, the final products still possess the natural form of the starting materials but differ from them in that they are brittle, readily pulverizable and digestible by proteolytic enzymes.

The products obtained by acid decomposition of scleroproteins, can be isolated without undue difficulty on account of their insolubility. In this they differ, advantageously, from the water-soluble decomposition products obtained according to hitherto used methods; for, the latter can only be separated with considerable difficulty (use of large amounts of salts for salting out) from the strongly acid solutions in which they are contained.

The new decomposition products are soluble in alkalies and can be reprecipitated from such solutions by acidifying. They can be used as feed, for the production of capsules for pharmaceutical preparations, for the manufacture of artificial horn-like compositions and the like. Moreover, by further treatment with proteolytic enzymes they can be converted into water-soluble protein cleavage products.

Instead of treating scleroproteins by means of acids, the first step of decomposing the same may be carried out by dissolving them in ammonical solutions of metal compounds or metal ammines and thereupon reprecipitating them with acids; thereby also compounds are obtained which can be transformed into water-soluble protein decomposition products by enzymatic working up. The treatment with metal ammine solutions can, for example, be carried out according to the method described by Schweitzer in Journal für praktische Chemie vol. 72 (1857) page 109. Instead of ammoniacal copper oxide solutions, the solutions of other metal ammines are also suitable. By this method of decomposition likewise products are obtained that are water-insoluble and still very similar in appearance to the starting material employed.

As already mentioned the final conversion into water-soluble products by way of enzymatic decomposition follows the production of water-insoluble products by treatment in the first step with acids or metal ammine solutions respectively.

The enzymes suitable for enzymatic decomposition belong to the proteinases and are, for example, pepsin, trypsin, papain and kathepsin. The use of pancreas extracts or trypsin-kinase is of special advantage. A combined enzymatic treatment consisting in first subjecting the starting material to the action of pepsin and thereafter to that of trypsin-kinase is also very suitable. The enzymatic decomposition can be carried out to various stages according to the duration of the treatment and the purpose for which the resulting decomposition products are intended to be used. Thus, on the one hand, water-soluble products, such as peptones, can be obtained, while on the other hand the decomposition can proceed as far as to the amino acids. If a rather extensive cleavage is intended then further treatment by means of erepsin or other suitable peptidases may follow.

In contrast to the products obtained by the hitherto known methods, the sulfur content as well as the content of physiologically active protein constituents of these water-soluble final products obtained on enzymatic decomposition correspond to a far-reaching extent with those of the starting material employed. They can therefore be employed for the manufacture of a great number of amino acids, especially those that can be obtained only with difficulty or not at all by hydrolysis with acids or alkalies; for, by this known treatment, they are either destroyed or converted, for instance, into racemic products. The high content of the decomposition products obtained according to this invention, of aromatic amino acids, such as tryptophane and tyrosine and other rarer amino-acids, render them very suitable for preparing nutrient media for bacteria or tissue cultures and for thereapeutic use. Thus, the products obtained from keratin having a high content of cystine or cysteine, are especially suitable for the treatment of eczema and as the skin and hair tonics.

The following examples serve to illustrate the invention without, however, limiting the same to them and the data given in these examples referring to duration of treatment, temperature, amounts used, and the like.

*Example 1*

100 grams of horn shavings having a cystine content of 7.8%, are soaked with 80 c.c. of water and placed on a glass suction filter. A moderate stream of gaseous hydrogen chloride is now sucked through the mass for 1 hour, it is then washed well with water and dried with alcohol and ether. 66 grams of a water-insoluble but digestible product similar in appearance to the starting material, are obtained, corresponding to a yield of 66%.

50 grams of this product are placed with 2 grams of pepsin into a 2 liter container. This is then filled up with hydrochloric acid-potassium chloride buffer solution (pH=2) and left for 24 hours in a thermostat at 40°. The residue is then removed by centrifuging, washed once with water and mixed with 200 c.c. of an ammonium chloride-ammonia (2:1) buffer solution and 200 c.c. of a glycerol extract of dried pancreas (1:16) previously activated with enterokinase, and the whole is again made up to 2 liters with water. After 2 days the residue is centrifuged off, washed and dried. The combined digestion solutions contain 73% of the keratin obtained on hydrochloric acid treatment.

*Example 2*

50 grams of silk are moistened with 33 grams of water and then treated with hydrochloric acid gas. The residue is well washed and dried. After pulverisation it represents a light gray, water-insoluble and digestible powder. 5 grams of this product are mixed with 500 milligrams of papain previously activated with hydrocyanic acid, and the mixture is made up to 500 c.c. with acetate buffer solution. The decomposition products which have gone into solution are then worked up in the usual manner.

*Example 3*

Elastin previously moistened with 20% of its weight of water, is treated with hydrochloric acid gas. The enzymatic decomposition of the water-insoluble products obtained thereby, is effected by means of pepsin and proceeds more quickly than with not previously treated elastin.

*Example 4*

10 grams of a purified keratin obtained from horn is treated with acetic acid containing hydrochloric acid (water content 10%) for 41 hours at room temperature. The undissolved keratin is filtered off, washed and dried. The yield of a water-insoluble, digestible product amounts to 84%, it corresponds in its appearance to the starting material used.

5 grams of this product are treated consecutively with pepsin and trypsin under the same conditions as in Example 1. After the treatment is completed, 77% of the starting material have gone into solution by the action of the enzymes.

Example 5

Keratin obtained from horn is treated with glacial acetic acid containing hydrogen bromide, for 4 hours as described in Example 2. A water-insoluble but digestible material is obtained in a yield of 92%.

By consecutive treatment with pepsin and trypsin as described in Example 1 47% of this material are brought into solution.

Example 6

Keratin obtained from horn is treated with 70-75% aqueous technical hydrofluoric acid for 24 hours at room temperature. A water-insoluble but digestible product is obtained in a yield of 60%.

60% of this product are brought into solution by consecutive treatment with pepsin and trypsin as described in Example 1.

Example 7

100 grams of horn are treated with 1 liter of 90% technical formic acid for 3 hours at 60° C. A water-insoluble but digestible product is obtained in a yield of 72%.

By consecutive treatment with pepsin and trypsin as described in the fore-going examples, 69% of this material are brought into solution.

Example 8

10 grams of horn are treated with 10 parts of phosphoric acid (spe. gravity 1.7) for 2½ hours at 60° C. The undissolved portion is filtered off by suction, washed and dried and yields 72% of a water-insoluble but digestible material.

By enzymatic treatment as described in the fore-going examples 57% therefrom are made soluble.

Example 9

10 grams of horn are treated with 100 cc. of 80% sulfuric acid for 1½ hours at 38° C. The reaction mixture is then poured into water and filtered. The residue obtained is washed and dried and yields 9.6 grams of a final product being water-insoluble and digestible.

By enzymatic treatment as described in the fore-going examples 89% of this material are made soluble.

Example 10

10 grams of horn shavings are allowed to stand with 100 cc. of thionyl chloride, thereupon the thionyl chloride is washed out and the keratinate is dried. The yield of a water-insoluble but digestible product amounts to 96%. Further treatment by enzymatic decomposition may be carried out as described in the fore-going examples.

Example 11

10 grams of horn shavings are treated with 200 cc. of 5% sulphuric acid for 2 hours at 90° C. The yield of a water-insoluble product amounts to 87%.

Further treatment by enzymatic decomposition may follow as described in the fore-going examples.

Example 12

150 grams of purified keratin obtained by dissolving keratin in ammoniacal copper oxide solution, reprecipitating with acid and thoroughly washing, are mixed with 500 cc. of ammonium chloride-ammonia buffer solution (consisting of 2 parts of n ammonia and 1 part of n ammonium chloride solution) and 300 cc. of a glycerol extract of dried pancreas (1:10), said extract being activated with enterokinase; the mixture is then made up with water to 5 liters. In half an hour the keratin is completely dissolved and cannot be re-precipitated by means of acids. By evaporating the solution and treating, for example, with methyl alcohol, the decomposed keratinate is obtained in the form of a whitish gray mass containing about 20% of ammonium chloride. An analysis of this mixture shows, calculated as salt-free product, a nitrogen content of 15.4%, a cystine content of 5% and a tryptophane content of 1.12%, whereas the horn used as starting material shows a cystine content of about 6 to 7% and a tryptophane content of about 1.19%. Hence, the tryptophane is fully and the cystine for the greater part preserved during decomposition.

Example 13

50 grams of wool are treated while shaking with a solution of 50 grams of nickel sulfate, 1 liter of concentrated ammonia and 90 grams of 33% sodium hydroxide solution. After 23 hours the keratin gone into solution, is precipitated by acidifying, filtered off, washed free from nickel by means of dilute acid and dried. The product obtained shows a cystine content of 4.1%.

5 grams of this starting material obtained in such a manner, are mixed with 10 cc. of ammonium chloride-ammonia buffer solution (consisting of 2 parts of n ammonia and 1 part of n ammonium chloride), 20 cc. of an aqueous extract of pancreas (1:10) and 50 cc. of water. After 3 days at a temperature of 40° C., the whole of the keratinate with the exception of an insignificant residue (about 5%) has gone into solution and no precipitation can be effected on acidifying. The concentrated digestion solutions are precipitated with acetone and the precipitated product containing about 2.5% of ammonium chloride, yields, on analysis a nitrogen content of 14.9%, a cystine content of 4% and a tryptophane content of 0.8%, calculated on the salt-free product.

Example 14

5 grams of keratin produced according to Example 13 by precipitation from its ammoniacal nickel solution, are brought to a pH of about 2 with 80 cc. of n/100 hydrochloric acid and mixed with 200 milligrams of pepsin. After 2 days at a temperature of 40° C., the keratinate has gone into solution with the exception of a residue of about 15% which is removed by centrifuging. The solution is concentrated by evaporation in a vacuum at about 40° C. and a salt-free product is precipitated by means of acetone. This product has a nitrogen content of 15.1%, a cystine content of 2.1% and a tryptophane content of 0.3%.

Many changes and variations may be made by those skilled in the art in the examples given as regards, for example, the reaction conditions, the concentration of the reagents and materials used, the reaction duration and temperature and

What we claim is:

1. A method for the decomposition of scleroproteins, comprising first treating said scleroproteins with agents capable of decomposing proteins, so that the products obtained are still water-insoluble and retain the original appearance of the starting material, but already digestible, isolating said water-insoluble but digestible decomposition products and then treating the latter with proteolytic enzymes, so as to form water-soluble decomposition products.

2. A method according to claim 1, wherein the first treatment is carried out by means of acidic compounds of sufficient reactivity, so as to be capable of decomposing said scleroproteins.

3. A method according to claim 1, wherein the first treatment is carried out by means of acid chlorides.

4. A method according to claim 1, wherein the first treatment is carried out by means of metal ammine solutions.

5. A method according to claim 1, wherein the water-insoluble but digestible decomposition products obtained by said first treatment, are converted into water-soluble products by further treatment with pepsin.

6. A method according to claim 1, wherein the water-insoluble but digestible decomposition products obtained by said first treatment, are converted into water-soluble products by further treatment with trypsin.

7. A method according to claim 1, wherein the water-insoluble but digestible decomposition products obtained by said first treatment, are converted into water-soluble products by further treatment with papain.

8. A method according to claim 1, wherein the water-insoluble but digestible decomposition products obtained by said first treatment, are converted into water-soluble products by further treatment with an enzyme taken from the class consisting of pepsin, trypsin, papain, kathepsin and pancreas extract.

9. Water-soluble decomposition products of scleroproteins having a cystine and tryptophane content substantially corresponding to that of the starting material, being obtained by first treating scleroproteins with agents capable of decomposing proteins, in such a manner that the resulting products are still water-insoluble, but digestible, isolating said products, and then treating the latter with proteolytic enzymes so as to form said water-soluble decomposition products.

10. Water-insoluble decomposition products of scleroproteins having a cystine and tryptophane content substantially corresponding to that of the starting material, and being digestible and thus capable of further decomposition by enzymes so as to form water-soluble decomposition products said water-insoluble decomposition products corresponding in their appearance to the scleroproteins used as starting material.

11. A method for the production of water-soluble decomposition products of scleroproteins, comprising treating water-insoluble, but digestible decomposition products of scleroproteins with proteolytic enzymes, and isolating the dissolved reaction products.

12. A method for the production of water-insoluble, but digestible decomposition products of scleroproteins, comprising dissolving said scleroproteins in solutions of metal ammine compounds, and isolating the water-insoluble, but digestible decomposition products from said solution.

13. A method for the production of water-insoluble, but digestible decomposition products of scleroproteins, comprising dissolving said scleroproteins in solutions of metal ammine compounds, and precipitating the water-insoluble, but digestible decomposition products by acidifying said solution.

14. A water-soluble decomposition product of scleroproteins having a cystine content of about 2 to 5%, a tryptophane content of about 0.3 to 1.2% and a nitrogen content of about 14.5 to 15.5%, calculated as salt-free product.

WOLFGANG GRASSMANN.
HANS REICH.